US012298732B2

(12) United States Patent
Reynolds et al.

(10) Patent No.: US 12,298,732 B2
(45) Date of Patent: May 13, 2025

(54) INSIGHT DRIVEN PROGRAMMING TAGS IN AN INDUSTRIAL AUTOMATION ENVIRONMENT

(71) Applicant: Rockwell Automation Technologies, Inc., Mayfield Heights, OH (US)

(72) Inventors: Jordan C. Reynolds, Austin, TX (US); John J. Hagerbaumer, Mequon, WI (US); Troy W. Mahr, Pleasant Prairie, WI (US); Thomas K. Jacobsen, Wake Forest, NC (US); Giancarlo Scaturchio, Pisa (IT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 551 days.

(21) Appl. No.: 17/698,715

(22) Filed: Mar. 18, 2022

(65) Prior Publication Data

US 2023/0297061 A1    Sep. 21, 2023

(51) Int. Cl.
G05B 19/05    (2006.01)

(52) U.S. Cl.
CPC .. *G05B 19/056* (2013.01); *G05B 2219/13004* (2013.01)

(58) Field of Classification Search
CPC ........ G05B 19/056; G05B 2219/13004; G05B 2219/15131; G05B 2219/33081; G06N 20/10; G06N 20/20; G06N 5/01
See application file for complete search history.

(56) References Cited

U.S. PATENT DOCUMENTS 5,933,638 A * 8/1999 Cencik ...................... G06F 8/20
715/209
6,609,070 B1 * 8/2003 Lueck ..................... G01N 33/18
702/50

(Continued)

FOREIGN PATENT DOCUMENTS

EP    3696622 A1    8/2020

OTHER PUBLICATIONS

Extended European Search Report for EP Application No. 23160434.9, mailed Jul. 28, 2023; 10 pages.

*Primary Examiner* — Scott T Baderman
*Assistant Examiner* — Mario M Velez-Lopez

(57) ABSTRACT

Various embodiments of the present technology generally relate to industrial automation environments. More specifically, embodiments include systems and methods to optimize a target variable in an industrial automation environment. In some examples, a design application generates a control program configured and selects a program tag that represents a target variable in an industrial process. A processing application identifies a set of available program tags that represent independent variables in the industrial process and determines correlations between ones of the independent variables and the target variable. The processing application selects available program tags that represent independent variables correlated with the target variable and generates a recommendation that indicates the selected available program tags. The design application modifies the control program using the selected available program tags to optimize the target variable. The design application transfers the control program for implementation by the programmable logic controller.

20 Claims, 8 Drawing Sheets

(56) References Cited

U.S. PATENT DOCUMENTS

| | | | | |
|---|---|---|---|---|
| 10,942,710 B1* | 3/2021 | Dunn | | G06F 8/33 |
| 11,063,916 B1* | 7/2021 | Ferreira | | G05B 19/054 |
| 2002/0133240 A1* | 9/2002 | Nagao | | G06F 9/4411 |
| | | | | 711/E12.084 |
| 2004/0153430 A1* | 8/2004 | Sayad | | G06F 16/285 |
| | | | | 707/E17.005 |
| 2011/0272501 A1* | 11/2011 | Butler | | G05B 13/024 |
| | | | | 241/15 |
| 2012/0022849 A1* | 1/2012 | Wang | | G05B 19/054 |
| | | | | 703/22 |
| 2013/0006395 A1* | 1/2013 | Plache | | G06F 3/04842 |
| | | | | 700/83 |
| 2015/0306618 A1* | 10/2015 | Petter | | B05B 1/12 |
| | | | | 239/69 |
| 2017/0032058 A1* | 2/2017 | Arbel | | G06F 30/33 |
| 2017/0060541 A1* | 3/2017 | Saleh | | G06F 8/34 |
| 2018/0259926 A1* | 9/2018 | Fujimura | | G05B 19/0428 |
| 2020/0005094 A1* | 1/2020 | Sinha | | G06V 30/422 |
| 2020/0034926 A1* | 1/2020 | Busch | | G06N 20/00 |
| 2020/0050181 A1* | 2/2020 | McDaniel | | G05B 17/02 |
| 2020/0103838 A1* | 4/2020 | Bertinetti | | G05B 17/02 |
| 2020/0150638 A1* | 5/2020 | Mourzine | | G05B 19/058 |
| 2020/0151479 A1* | 5/2020 | Cordell | | G08G 1/166 |
| 2020/0265329 A1* | 8/2020 | Thomsen | | G06N 20/10 |
| 2021/0080941 A1* | 3/2021 | Entzminger | | G05B 19/41855 |
| 2021/0096827 A1* | 4/2021 | Stump | | G05B 19/4188 |
| 2021/0397152 A1* | 12/2021 | Chen | | G05B 19/0426 |
| 2021/0397166 A1* | 12/2021 | Sayyarrodsari | | G06F 8/30 |
| 2021/0397171 A1* | 12/2021 | Sayyarrodsari | | G06F 8/34 |
| 2022/0121988 A1* | 4/2022 | Margineantu | | G06N 20/10 |
| 2023/0041229 A1* | 2/2023 | Tahvilian | | G06T 7/90 |
| 2023/0094187 A1* | 3/2023 | Reynolds | | G06F 8/33 |
| | | | | 700/47 |
| 2023/0297061 A1* | 9/2023 | Reynolds | | G06N 5/01 |
| | | | | 700/47 |
| 2023/0297343 A1* | 9/2023 | Jin | | G06F 8/34 |
| | | | | 717/109 |
| 2023/0359173 A1* | 11/2023 | Hildebrandt | | G05B 19/4155 |
| 2023/0418243 A1* | 12/2023 | Reynolds | | G05B 13/0265 |
| 2024/0291785 A1* | 8/2024 | Fields | | H04L 51/02 |

\* cited by examiner ced by the selected program tag. The design application transfers the control program for implementation by the programmable logic controller.

INSIGHT DRIVEN PROGRAMMING TAGS IN AN INDUSTRIAL AUTOMATION ENVIRONMENT

BACKGROUND

Industrial manufacturing environments generate huge quantities of data at very fast speeds making the extraction of enterprise-level insights challenging. In industrial automation environments, control systems are used to drive various operations along an industrial line. Control programs are developed by programmers and comprise a set of program tags to carry out an industrial operation. The program tags comprise chunks of the control code and correspond to industrial assets, devices, and sensors. Control code is used by control systems like Programmable Logic Controllers (PLCs) to drive the industrial assets, devices, and sensors in an industrial process. Industrial manufacturing environments typically comprise a large number of assets, devices, and sensors and the number of tags available for use in the control programs is correspondingly large. Unfortunately, the large number of available tags makes targeting specific variables in an industrial process difficult. Moreover, industrial automation environments do not effectively or efficiently surface potentially useful tags within the control programs.

Machine learning algorithms are designed to recognize patterns and automatically improve through training and the use of data. Examples of machine learning algorithms include artificial neural networks, nearest neighbor methods, gradient-boosted trees, ensemble random forests, support vector machines, naïve Bayes methods, and linear regressions. A machine learning algorithm comprises an input layer and an output layer, wherein complex analyzation takes places between the two layers. Various training methods are used to train machine learning algorithms wherein an algorithm is continually updated and optimized until a satisfactory model is achieved. One advantage of machine learning algorithms is their ability to learn by example, rather than needing to be manually programmed to perform a task, especially when the tasks would require a near-impossible amount of programming to perform the operations in which they are used. Unfortunately, it is difficult to integrate machine learning models into the programming systems of industrial manufacturing environments.

Overview

This Overview is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Various embodiments of the present technology generally relate to solutions for integrating machine learning models into industrial automation environments. Some embodiments comprise a system to optimize a target variable in an industrial automation environment. In some examples, the system comprises a design application and a processing application. The design application generates a control program configured for implementation by a programmable logic controller. The design application selects a program tag that represents a target variable in an industrial process. The processing application identifies a set of available program tags that represent independent variables in the industrial process. The processing application determines correlations between ones of the independent variables and the target variable. The processing application selects individual ones of the set of available program tags that represent independent variables correlated with the target variable. The processing application generates a recommendation that indicates the selected ones of the set of available program tags. The design application modifies the control program using the selected ones of the available program tags to optimize the target variable based on the correlations between the independent variables represented by the selected ones of the available program tags and the target variable represented by the selected program tag. The design application transfers the control program for implementation by the programmable logic controller.

In some embodiments, an apparatus comprises computer readable storage media and processors operatively coupled with the computer readable storage media. The storage media store program instructions to optimize a target variable in an industrial process. When the program instructions are executed by the processors, the computing apparatus generates a control program configured for implementation by a programmable logic controller. The computing apparatus selects a program tag that represents a target variable in an industrial process. The computing apparatus identifies a set of available program tags that represent independent variables in the industrial process. The computing apparatus determines correlations between ones of the independent variables and the target variable. The computing apparatus selects individual ones of the set of available program tags that represent independent variables correlated with the target variable. The computing apparatus generates a recommendation that indicates the selected ones of the set of available program tags. The computing apparatus modifies the control program using the selected ones of the available program tags to optimize the target variable based on the correlations between the independent variables represented by the selected ones of the available program tags and the target variable represented by the selected program tag. The computing apparatus transfers the control program for implementation by the programmable logic controller.

Some embodiments comprise a method to optimize a target variable in an industrial process. The method entails generating a control program configured for implementation by a programmable logic controller and selecting a program tag that represents a target variable in an industrial process. The method continues by identifying a set of available program tags that represent independent variables in the industrial process determining correlations between ones of the independent variables and the target variable. The method continues by selecting individual ones of the set of available program tags that represent independent variables correlated with the target variable and generating a recommendation that indicates the selected ones of the set of available program tags. The method continues by modifying the control program using the selected ones of the available program tags to optimize the target variable based on the correlations between the independent variables represented by the selected ones of the available program tags and the target variable represented by the selected program tag. The method continues by transferring the control program for implementation by the programmable logic controller.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
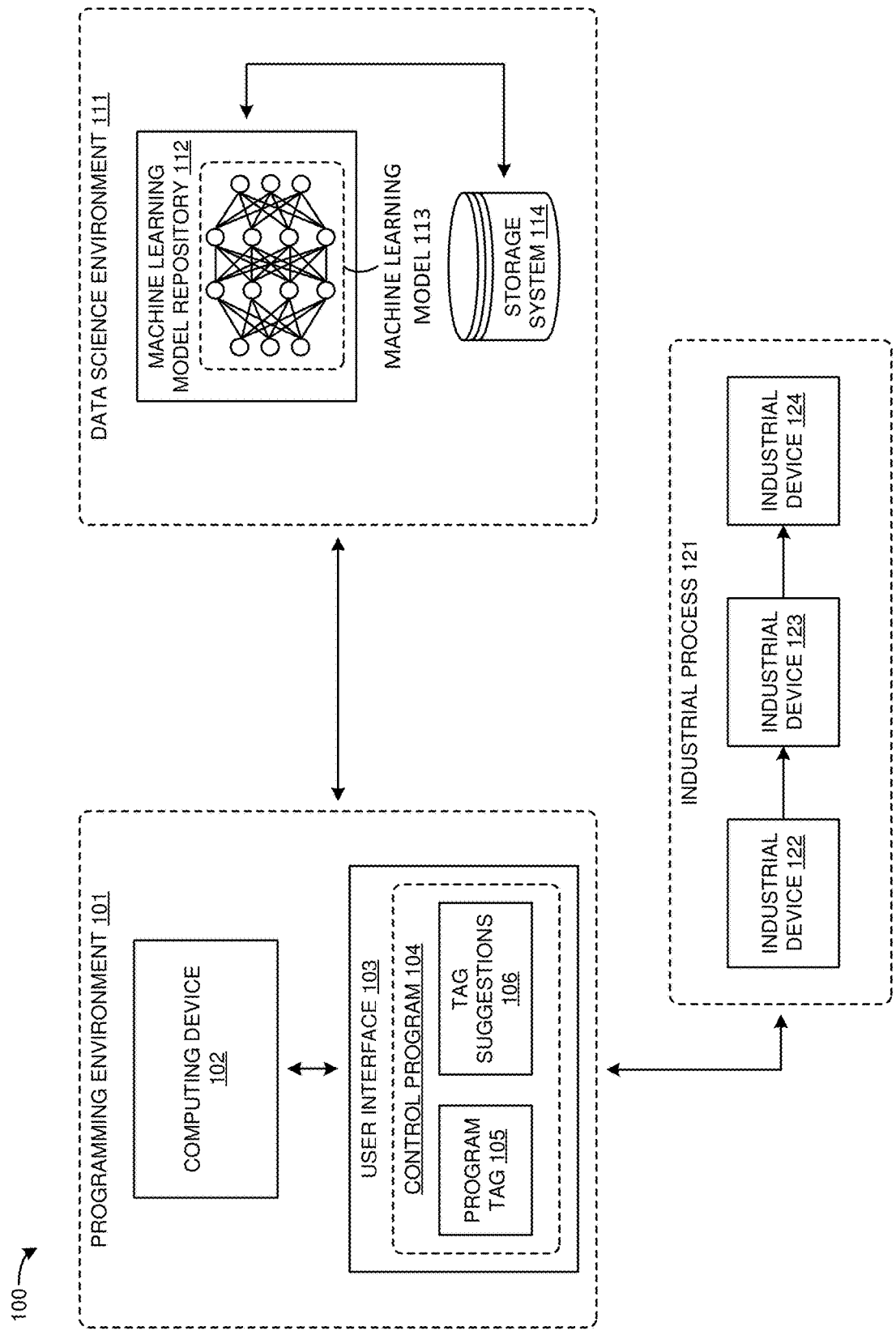
FIG. 1 illustrates an exemplary industrial automation environment to optimize a target variable in the industrial automation environment.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the present technology generally relate to solutions for integrating machine learning models into industrial automation environments. More specifically, embodiments of the present technology include systems and methods for implementing applying machine learning techniques to control programs to surface program tags to optimize a target variable. Generally, industrial control programs provide instructions for controlling and performing certain operations within an industrial environment via controllers like Programmable Logic Controllers (PLCs). The controllers execute the control code to control downstream devices, machinery, and automated processes.

The present technology serves to enhance industrial control by enabling the use of machine learning models within control programs for more advanced control. Industrial automation environments often fail to effectively integrate machine learning models to assist in generating control programs. In an implementation of the present technology, machine learning models may be made available to programmers in the industrial programming environment. Programming environments allow a programmer to "drag and drop" program tags that represent industrial assets into a control program. The program tags correspond to machinery in an automated process, machine settings, machine operations, and the like. The programmer can connect the tags to one another to construct a control program designed to implement an automated industrial process.

In accordance with the present disclosure, machine learning models may be connected with other elements within the industrial automation environment like design application servers in the programming environment or PLCs. In an embodiment, a model may consume data relevant to operations within an industrial automation environment. The model may determine correlations between process variables in the industrial automation environment. The model may identify program tags associated with the correlated process variables and in response, determine the program tags are correlated. For example, an input to the machine learning model may be data from a temperature sensor that is monitoring the temperature delta of a heat exchanger process. In response to input from the temperature sensor, the model may identify other variables correlated with the temperature delta of the heat exchanger process. The output from the model may identify a set of program tags the represent the correlated variables. The identified program tags may be integrated into an existing control program to optimize the temperature delta of the heat exchanger process.

In another example, a design application in a programming environment may generate a control program. The program may comprise a set of program tags the comprise control code configured for ingestion by a PLC. The design application may receive user input that selects a one of the program tags in the control program. The selection indicates a command to optimize the target variable represented by the selected program tag. For example, the target variable may comprise vessel pressure and the selected tag may comprise control code that monitors the vessel pressure. The design application may interface with a machine learning model and/or a data repository to surface other program tags that are correlated with the selected program tag. The design application may present correlated program tags to a user and modify the control program using the correlated program tags in response to user input.

In accordance with the present disclosure, a machine learning model comprises one or more machine learning algorithms that are trained based on historical data and/or other types of training data. A machine learning model may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or similar machine learning techniques or combinations thereof capable of predicting output based on input data. Determining which machine learning methods to use may depend on the specific purpose or functions required in a particular industrial setting. In some examples, a machine learning asset outputs a program tag recommendation for a control program generated by a programmer, wherein that output can be used to add program tags to control program. Other outputs with a similar purpose may exist and are contemplated herein.

Machine learning models may be deployed on premises in an industrial automation environment or off-site. For example, the machine learning model may be implemented in a data science environment and have a live connection with a programming environment configured to generate control programs. Machine learning models inherently have a useful lifecycle as the environment around it changes. Over time, the models become ubiquitous and can, in essence, wear out, just like any other machine or sensor on an industrial line. Thus, the machine learning assets disclosed herein may be periodically replaced and/or retrained to maintain the integrity of machine learning outputs.

To accompany the use of control program integrated models, corresponding faceplates, displays, Human Machine Interfaces (HMIs), and the like are contemplated herein to provide intuitive representations and interfaces to models on-site. A faceplate may comprise basic controls and/or visuals relevant to the control program that the model is assisting within the control environment. In this manner, machine learning can be brought into the on-site user experience as well as into the programming environment. For example, an operator can view or use a kiosk within the industrial automation environment to perform a task such as reviewing tag suggestions, accessing tag correlations, identifying active data pipelines with the model, and/or other types of interaction with the machine learning model. The faceplate may also be useful for performing slightly more complex tasks such as offsetting parameters, providing inputs, tuning parameters of the model, overriding the model, or checking the status of the model.

Now referring to the Figures, FIG. 1 illustrates industrial automation environment 100 to optimize a target variable in an automated industrial process. Industrial automation environment 100 performs services like factory automation, factory control, machine control, smart manufacturing, machine communication and organization, and the like. Industrial automation environment 100 comprises programming environment 101, data science environment 111, and industrial process 121. Programming environment 101 comprises computing device 102, user interface 103, and control program 104. Data science environment 111 comprises machine learning model repository 112, machine learning model 113, and storage system 114. Industrial process 121 comprises industrial devices 122-124. In other examples, industrial automation environment 100 may include fewer or additional components than those illustrated in FIG. 1. Likewise, the illustrated components of industrial automation environment 100 may include fewer or additional components, assets, or connections than shown. Each of computing device 102, user interface 103, machine learning model repository 112, and/or storage system 114, may be representative of a single computing apparatus or multiple computing apparatuses.

Computing device 102 comprises one or more computing apparatuses configured to host an application(s) to generate control program 104, to interface with data science environment 111, and to interface with industrial process 121. It should be appreciated that the specific number of applications/modules hosted by computing device 102 is not limited. Exemplary applications hosted by computing device 102 to generate control program 104 include Studio 5000 and the like. Control program 104 comprises program tag 105 and tag suggestions 106. Control program 104 is representative of machine instructions that direct the operations of industrial process 121. Control program 104 may comprise a functional block diagram, ladder logic, or some other type of machine instructions. Computing device 102 may transfer control program 104 to industrial process 121 to control the operations of machines 122-124. Program tag 105 corresponds to a program instruction for one of industrial devices 122-124. For example, program tag 105 may comprise instructions that direct a motor of industrial device 122 to start. In some examples, control program 104 comprises additional program tags that correspond to additional program instructions. Tag suggestions 106 comprise a machine learning output generated by machine learning model 113 that indicates potential program tags that can be incorporated into control program 104.

Computing device 102 is coupled to user interface 103. User interface 103 comprises a display, keyboard, touchscreen, tablet, and the like. User interface 103 displays a Guided User Interface (GUI) that allows a user to interact with the application(s) hosted by computing device 102, including the design application configured to generate control program 104. A user may interact with the GUI via user interface 103 to generate control program 104. For example, a user may select, drag-and-drop, or perform some type of action via user interface 103 to construct control program 104.

Programming environment 101 is coupled to data science environment 111. For example, computing device 102 may host an interfacing application to communicate with machine learning model repository 112 and to communicate with storage system 114. Machine learning model repository 112 hosts machine learning model 113. Machine learning model 113 is representative of any machine learning model implemented within industrial automation environment 100 as described herein. Machine learning model 113 is configured to determine correlations between different program tags that represent the various processes and variables industrial process 121. Machine learning model 113 hosted by repository 112 may be trained using input data generated from by computing device 102, industrial devices 122-124, storage system 114, external sources, and/or some other type of training source. Machine learning model repository 112 may receive control program 104 from computing device 102. Machine learning model 113 may process a selected program tag in control program 104 (e.g., program tag 105) and generate an output (e.g., tag suggestions 106) that indicates other program tags correlated with the variable, process, or operation governed by the selected program tag. Machine learning model repository 112 may transfer the output generated by model 113 to computing device 102 for display on user interface 103.

Machine learning model repository 112 is coupled to storage system 114. Storage system 114 is representative of a database, data structure, and/or some other type of storage device or collection of storage devices. Storage system 114 comprises storage media like hard disk drive, solid state drives, Random Access Memory (RAM), and the like. Storage system 114 may store an array that indicates correlations between the different programming tags associated with industrial process 121. In some examples, machine learning model 113 receives process data generated by programming environment 101 and by industrial process 121 and may determine correlations for the different tags based on the process data. Machine learning model 113 may generate the array stored by storage system 114 to indicate the correlations.

Programming environment 101 is functionally coupled to industrial process 121. For example, computing device 102 may be functionally coupled to a Programmable Logic Controller (PLC) that implements control programs to control industrial process 121. Industrial process 121 is representative of a manufacturing, chemical production, food processing, or any other type of industrial process. Industrial devices 122-124 are representative of machines configured to carry out industrial process 121. Industrial devices 122-124 are representative of pumps, motors, heat exchanges, reactors, food processing systems, or any other type of industrial device. Typically, the type of machines represented by industrial devices 122-124 depend in part on the type of process that industrial process 121 is representative of. Industrial devices 122-124 receive machine instructions generated in programming environment 101 and operate in response to the instructions to implement industrial process 121.

Programming environment 101, data science environment 111, and industrial process 121 communicate over various communication links using communication technologies like industrial ethernet, Institute of Electrical and Electronic Engineers (IEEE) 802.3 (ENET), IEEE 802.11 (WIFI), Bluetooth, Time Division Multiplex (TDM), Data Over Cable System Interface Specification (DOCSIS), Internet Protocol (IP), General Packet Radio Service Transfer Protocol (GTP), and/or some other type of wireline and/or wireless networking protocol. The communication links comprise metallic links, glass fibers, radio channels, or some other communication media. The links use ENET, WIFI, virtual switching, inter-processor communication, bus interfaces, and/or some other data communication protocols.

Computing device 102, user interface 103, machine learning model repository 112, storage system 114, and industrial devices 122-124 comprise microprocessors, software, memories, transceivers, bus circuitry, and the like. The microprocessors comprise Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of industrial automation environment 100 as described herein.

Figure 2:
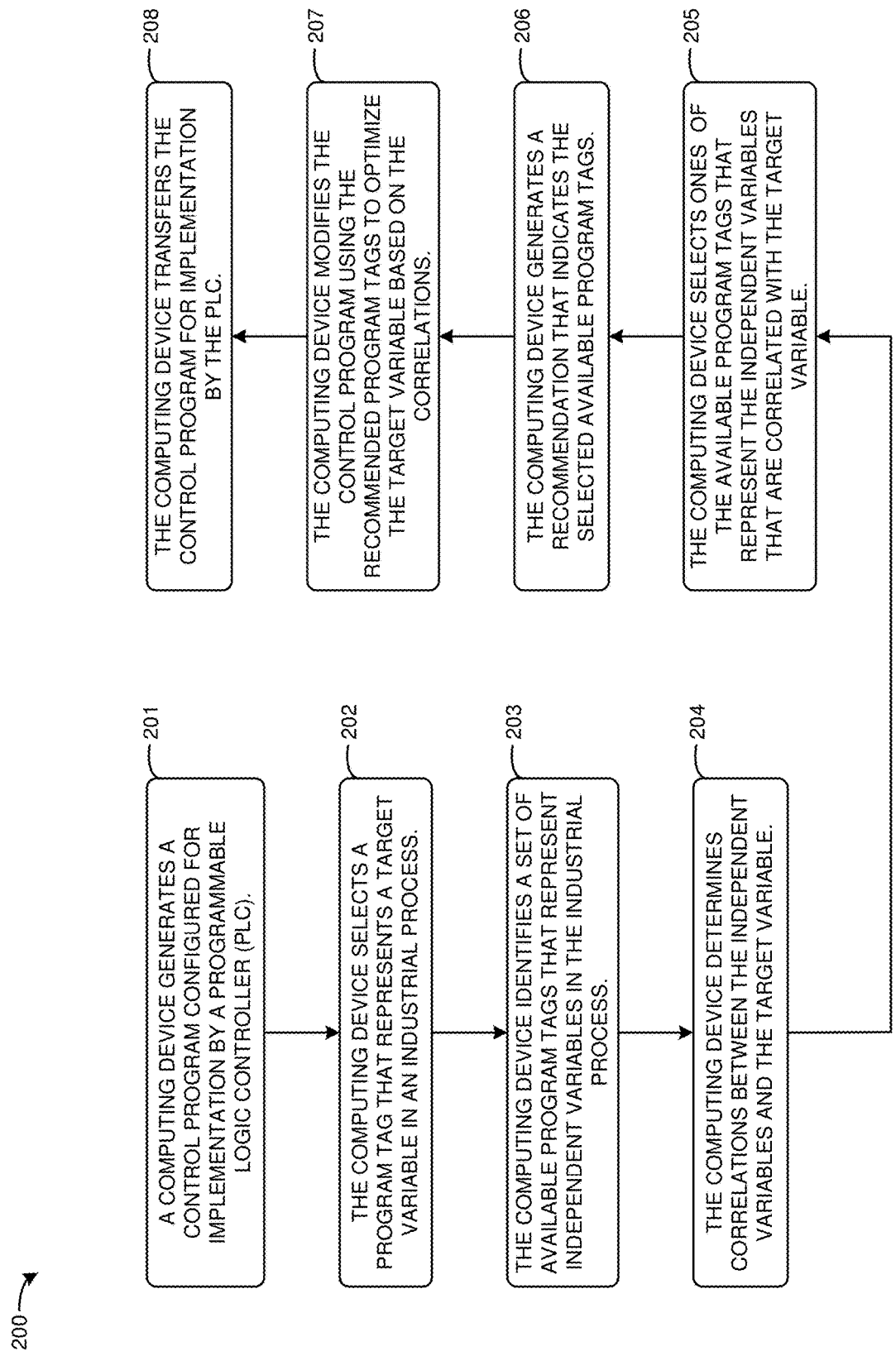
FIG. 2 illustrates an exemplary operation of an industrial automation environment to optimize a target variable in the industrial automation environment.

In some examples, industrial automation environment 100 implements process 200 illustrated in FIG. 2. It should be appreciated that the structure and operation of industrial automation environment 100 may differ in other examples.

FIG. 2 illustrates process 200. Process 200 comprises a target variable optimization process. Program 200 may be implemented in program instructions in the context of any of the software applications, module components, or other such elements of one or more computing devices. The program instructions direct the computing device(s) to operate as follows, referred to in the singular for the sake of clarity.

In operation, a computing device generates a control program configured for implementation by a Programmable Logic Controller (PLC) (201). The computing device selects a program tag that represents a target variable in an industrial process (202). The computing device identifies a set of available program tags that represent independent variables in the industrial process (203). The computing device determines correlations between the independent variables and the target variable (204). The computing device selects ones of the available program tags that represent the independent variables that are correlated with the target variable (205). The computing device generates a recommendation that indicates the selected available program tags (206). The computing device modifies the control program using the recommended program tags to optimize the target variable based on the correlations (207). The computing devices transfers the control program for the implementation by the PLC (208).

Referring back to FIG. 1, industrial automation environment 100 includes a brief example of process 200 as employed by one or more applications hosted programming environment 101 and data science environment 111. In operation, a design application hosted by computing device 102 generates control program 104 that is configured for implementation by a PLC (101). For example, the design application may receive user inputs via user interface 103 and responsively generate control program 104 based on the user inputs. Control program 104 comprises a set of program tags, including program tag 105, that comprise control code that drive the operation of industrial process 121. Industrial process 121 may comprise a PLC. The PLC may be configured to ingest and execute control program 104 to control the operation of industrial devices 122-124. The design application selects program tag 105 in control program 104 (102). Program tag 105 represents a target variable in industrial process 121. For example, program tag 105 may represent the pressure in industrial device 124. User interface 103 may receive a one or more inputs from a user that direct the design application to select program tag 105. For example, a user may wish to manipulate the target variable represented by program tag 105 to achieve a desired setpoint.

The design application hosted by computing device 102 notifies machine learning model 113 hosted by repository 112 of the tag selection. Machine learning model 112 identifies a set of available program tags that represent independent variables in industrial process 121 (103). For example, machine learning model 113 may identify that program tag 105 represents a target variable in industrial process 121 and in response, query storage system 114 for all program tags that represent independent variables in industrial process 121. Machine learning model 113 determines correlations between the target variable represented by program tag 105 and other independent variables of industrial process 121 represented by the available program tags (204). Machine learning model 113 may ingest program tag 105 and the available program tags indicated by storage system 114 as machine learning inputs. Machine learning model 113 may process the ingested tags using machine learning algorithms and generate an output that indicates correlations between the available independent variables and the target variable represented by program tag 105.

Machine learning model 113 selects ones of the available program tags that represent independent variables that are correlated with the target variable represented by program tag 105 (205). Machine learning model 113 may identify available program tags that represent the correlated variables and select those available program tags. For example, program tag 105 may represent the pressure of industrial device 124 and the temperature of industrial device 123 may be correlated with the pressure. In response, machine learning model 114 may select the available program tag that represents the temperature of industrial device 123. Machine learning model 114 generates tag suggestions 106 that indicates the selected program tags (206). Machine learning model repository 113 transfers tag suggestions 106 to computing device 102. The design application hosted by computing device 102 receives tag recommendations 106 and in response, presents tag recommendations on user interface 103. The design application modifies control program 104 based on tag suggestions 106 (207). For example, the design application may receive user inputs via user interface 103 that direct the design application to integrate tag suggestions 106 into control program 104. The design application may then modify control program 104 to incorporate the tags. The incorporation of tag suggestions 106 effectively optimizes the target variable represented by program tag 105. The design application transfers control program 104 to the PLC in industrial process 121 for implementation (208).

Advantageously, industrial automation environment 100 effectively surfaces correlated program tags for use in a control program to optimize a target variable of an industrial process. Moreover, machine learning model 114 efficiently determines correlations between a selected tag in the control program and other available tags in industrial automation environment 100.

Figure 3:
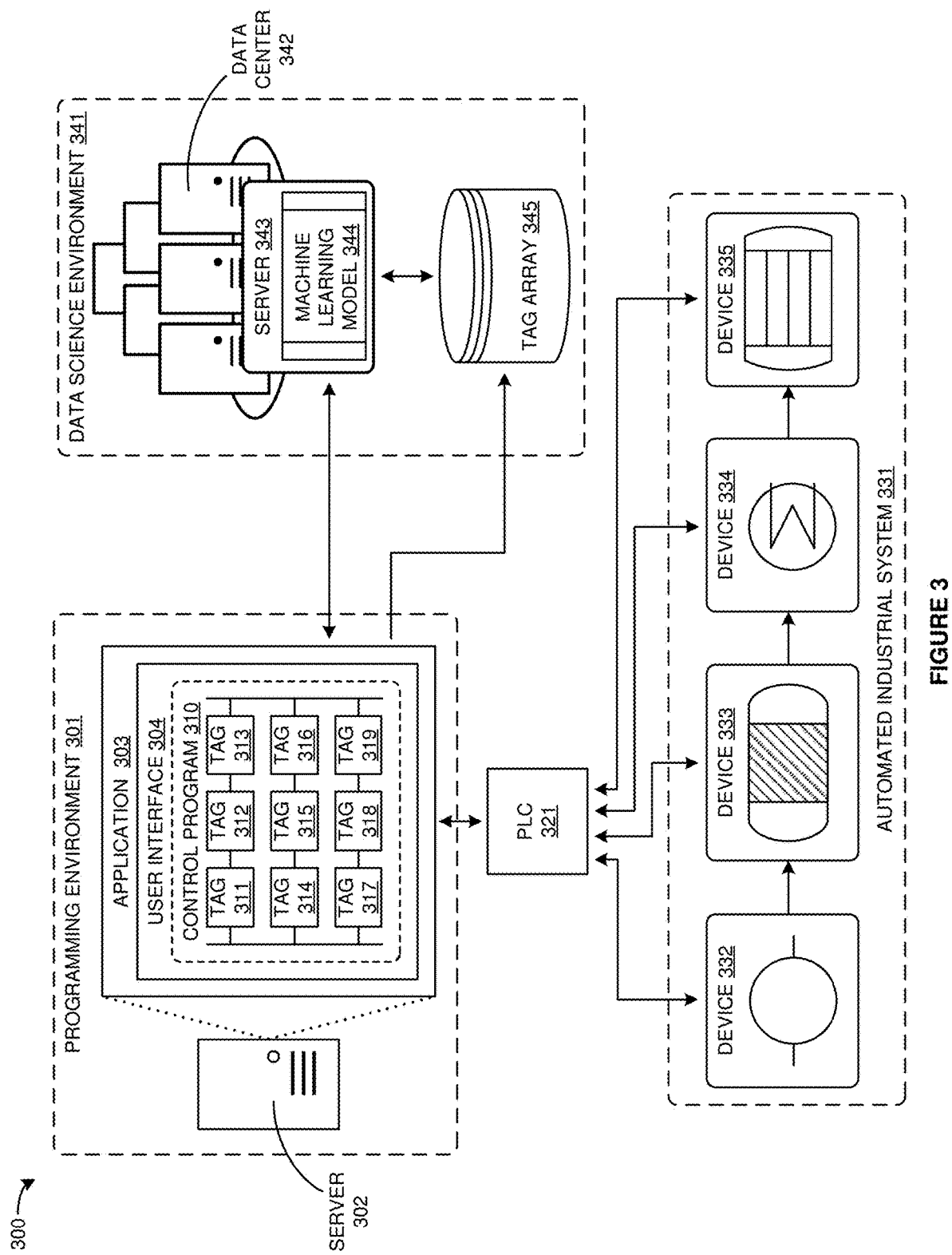
FIG. 3 illustrates an exemplary industrial automation environment to optimize a target variable in the industrial automation environment.

FIG. 3 illustrates an industrial automation environment 300 to optimize a target variable in an automated industrial process. Industrial automation environment 300 comprises an example of industrial automation environment 100, however environment 100 may differ. Industrial automation environment 300 comprises programming environment 301, Programmable Logic Controller (PLC) 321, automated industrial system 331, and data science environment 341. Programming environment 301 comprises server 302, application 303, user interface 304, and control program 310. Control program 310 comprise program tags 311-319 and is representative of a ladder logic diagram configured for ingestion by PLC 321. Automated industrial system 331 comprises industrial devices 332-335. Data science environment 341 comprises data center 342, server 343, machine learning model 344, and tag array 345.

Programming environment 301 is representative of one or more computing devices integrated into a network configured to generate control instructions for industrial automation environment 300 and that communicate with data science environment 341. Programming environment 301 comprises server 302. Server 302 comprises one or more computing device configured to host application 303. The one or more computing devices that comprise server 302 comprise processors, bus circuitry, storage devices, software, and the like. The processors may comprise Central Processing Units (CPUs), Graphical Processing Units (GPUs), Application Specific Integrated Circuits (ASICs), and the like. The storage devices comprise flash drives, Random Access Memory (RAM), Hard Disk Drives (HDDs), Solid State Drives (SSDs), Non-Volatile Memory Express (NVMe) SSDs, and the like. The storage devices store the software. The processors may retrieve and execute software stored on the storage devices to drive the operation of application 303.

Application 303 is representative of one or more design applications, machine learning interface applications, user interface applications, operating systems, modules, and the like. Application 303 is configured to receive user inputs via user interface 304 and generate control program 310 based on the user inputs and/or other types of inputs.

User interface 304 is representative of a display that provides a graphical representation of application 303. The graphical representation may include one or more visual indicators relevant to control program 310, such as visual indicators of visual code blocks, ladder logic, code chunks, functional block diagrams, machine learning optimizations, and/or other types of visual indictors. User interface 304 may comprise a faceplate for viewing or use by an operator or similar user within programming environment 301. User interface 304 may include a computer, a mobile device, a kiosk, a touchscreen device, a Human Machine Interface (HMI) or some other type of computing device capable of performing the user interface functions described herein. A user may interact with application 303 via user interface 304 to generate control program 310. Upon generation of control program 310, application 303 may request machine learning analysis of control program 310. For example, a user may identify the variable represented by tag 314 as a target variable and select tag 314 to receive machine learning feedback.

PLC 321 is representative of an industrial controller configured to execute a control program (e.g., control program 310) to implement an automated industrial process in industrial system 331. PLC 321 comprises one or more computing devices. The one or more computing devices of PLC 321 comprise processors, bus circuitry, storage devices, software, and the like. The processors may comprise CPUs, GPUs, ASICs, and the like. The storage devices comprise flash drives, RAM, HDDs, SSDs, NVMe SSDs, and the like. The storage devices store the software. The processors may retrieve and execute software stored on the storage devices to drive the operation of PLC 321.

PLC 321 is coupled to application 303 and to industrial devices 332-335. PLC 321 receives and implements control program 310 from computing device 102 to control the operation of devices 332-335. Program tags 311-319 that constitute control program 104 comprise industrial control code that provide instructions for PLC 321 to control the operations of devices 332-335. PLC 321 identifies which tags of control program 104 correspond to the ones of devices 332-335. For example, PLC 321 may determine the tags 311-313 are on a ladder logic rung for device 332 and may implement the control instructions of tags 311-313 to activate the various components of device 332.

Automated industrial system 331 is representative of an automated industrial process. The industrial processes may comprise a manufacturing process, chemical production process, food processing process, or any other type of automated industrial process. Although automated industrial system 331 is depicted with four industrial devices, in other examples automated systems may comprise a different number of industrial devices. Industrial devices 332-335 may comprise devices like pumps, compressors, heat exchanges, centrifuges, mills, conveyers, filters, and the like. Industrial devices 332-335 may comprise subcomponents (not illustrated for clarity) like motors, valves, electrical circuitry, processing circuitry, storage circuitry, transceivers, machined parts, and the like.

Industrial devices 332-335 are coupled to PLC 321. PLC 321 transfers executed program instructions to automated industrial system 331 to implement their respective industrial processes. Industrial devices 332-335 receive their respective instructions and responsively operate according to the instructions. For example, industrial device 332 may comprise an electric motor to drive a pump. PLC 321 may execute the control instructions and determine a current level to power the electric motor at to achieve a desired pressure differential in the pump. PLC 321 may transfer the executed instructions to the motor in industrial device 332.

The motor in industrial device 332 may receive the executed instructions and apply the indicated current level to achieve the necessary power level for the electric motor to drive the motor at the speed necessary to achieve the desired pressure differential.

As industrial devices 332-335 operate based on control program 310, they generate operational process data. The operational data indicates the status of variables, operations, and/or processes of industrial devices 332-335. Industrial devices 332-335 report operational process data to PLC 321. For example, industrial device 332 may comprise a furnace and may continuously report its temperature to PLC 321 as operational process data. PLC 321 reports the operational process data to application 303.

Data science environment 341 comprises data center 342 and tag array 345. Data center 342 is representative of one or more computing devices integrated into a network that communicates with tag array 345 and application 303. Examples of data center 342 may include server computers and data storage devices deployed on-premises, in the cloud, in a hybrid cloud, or elsewhere, by service providers such as enterprises, organizations, individuals, and the like. Data center 342 may rely on the physical connections provided by one or more other network providers such as transit network providers, Internet backbone providers, and the like to communicate with tag array 345 and/or application 303. Data center 342 comprises server computer 343 which hosts machine learning model 344.

Server computer 343 comprises processors, bus circuitry, storage devices, software, and the like configured to host machine learning model 344. The processors may comprise CPUs, GPUs, ASICs, and the like. The storage devices comprise flash drives, RAM, HDDs, SSDs, NVMe SSDs, and the like. The storage devices store the software. The processors may retrieve and execute software stored on the storage devices to drive the operation of machine learning model 344.

Machine learning model 344 is hosted on server computer 343. Machine learning model 344 comprises one or more machine learning algorithms that are trained to determine tag suggestions for a control program based on variable correlations in automated industrial system 331. Machine learning model 344 may employ one or more machine learning algorithms through which data can be analyzed to identify patterns, make decisions, make predictions, or similarly produce output that can inform control code and/or parameters. Examples of machine learning algorithms that may be employed solely or in conjunction with one another include artificial neural networks, nearest neighbor methods, ensemble random forests, support vector machines, naïve Bayes methods, linear regressions, or other types of machine learning algorithms that predict output data based on input data. Determining which machine learning methods to use may depend on the specific purpose or functions required in a particular industrial setting. Machine learning model 344 may ingest the training data received from tag array 345 to train itself. For example, machine learning model 344 may receive control programs, ladder logic, block diagrams, image files, performance metrics, and/other training data as inputs. Machine learning model 344 may utilize supervised learning methods, unsupervised learning methods, and/or reinforcement learning methods to train itself. The training data may comprise feature vectors that comprise numeric representations of the training data. For example, a feature vector may represent program tags available for use in automated industrial system 331.

In some examples, machine learning model 344 ingests feature vectors that represent process data generated by automated industrial system 331. Machine learning model 344 identifies correlations and causal relations between process variables of automated industrial system 331 based on the process data. Machine learning model stores the correlations and causal relations in tag array 345.

In some examples, machine learning model 344 receives a tag selection from application 303. The tag selection comprises a program tag (e.g., tag 311) that represents a target variable in automated industrial system 331. For example, machine learning model 344 may ingest feature vectors represent the tag selection as an input. Machine learning model 344 utilizes its trained algorithms to process the inputs and generate an output. For example, machine learning model 344 may intake a feature vector that represents the tag selection and generates an output that indicates other program tags correlated with the selected tag. Alternatively, machine learning model 344 may intake a feature vector that represents a tag selection and query the database 345 to determine other correlated programming tags. Machine learning model 344 may transfer the machine learning output to application 303 for presentation on user interface 304.

Tag array 345 comprises processors, bus circuitry, storage devices, software, and the like configured to host machine learning model 344. The processors may comprise CPUs, GPUs, ASICs, and the like. The storage devices comprise flash drives, RAM, HDDs, SSDs, NVMe SSDs, and the like. Tag array 345 receives and stores the performance metrics and the control instructions from PLC 321. Tag array 345 stores a data structure that indicates correlations and causal relations between variables in automated industrial system 331. Tag array 345 also stores which program tags are associated with each of the variables. For example, database 345 may store an indication that tag 319 represents pressure of device 335. In some examples, tag array 345 receives correlations determined by machine learning model 344 and stores the correlations in the data structure. Database 345 may receive correlation updates from machine learning model 344 and responsively update the array based on the correlation updates. In some examples, application 303 may access tag array 345 to surface correlated program tags in control program 310.

Figure 4:
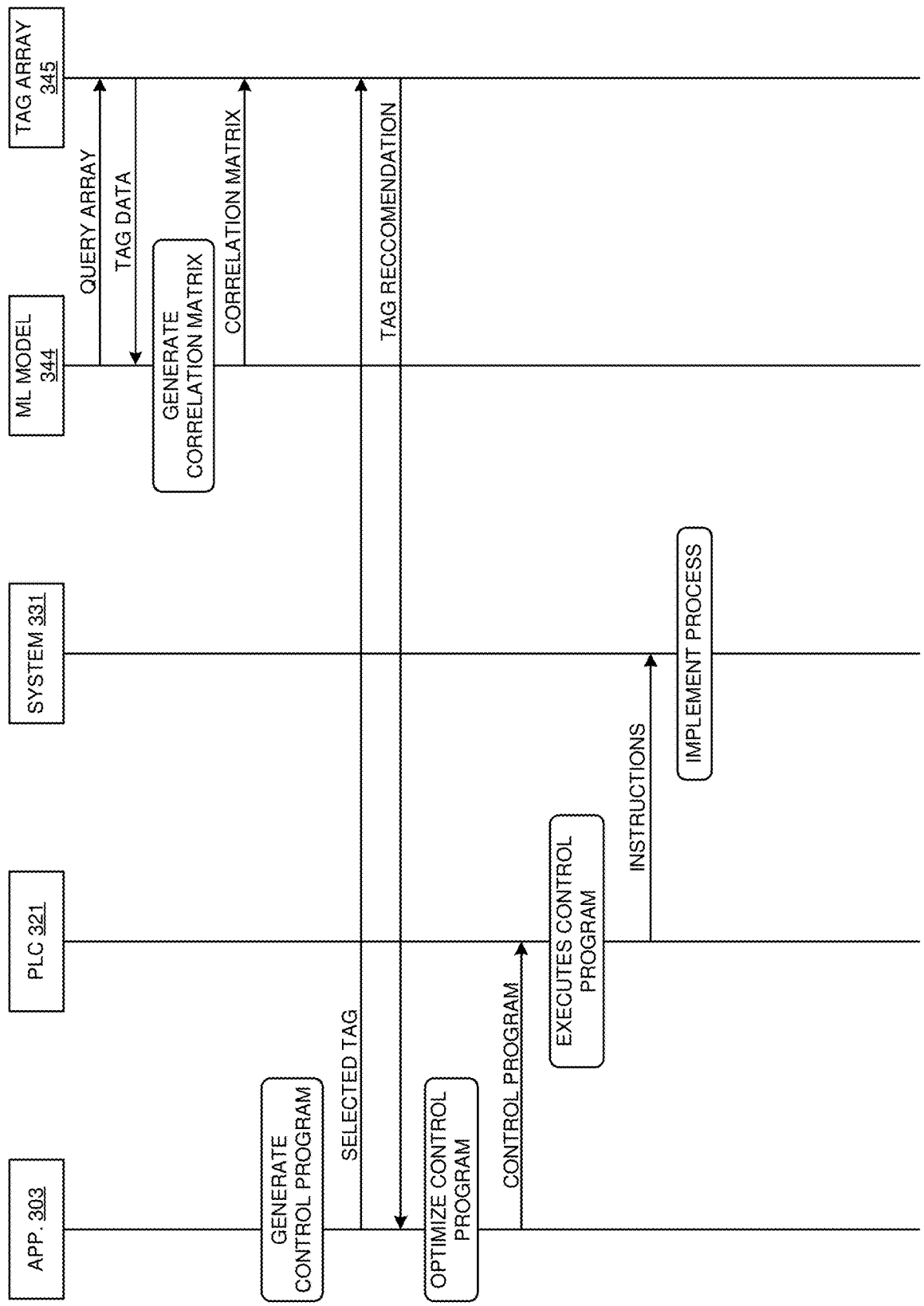
FIG. 4 illustrates an exemplary operation of an industrial automation environment to optimize a target variable in the industrial automation environment.

FIG. 4 illustrates an exemplary operation of industrial automation environment 300 to optimize a functional block diagram for implementation by a PLC. The operation depicted by FIG. 4 comprises an example of process 200 illustrated in FIG. 2, however process 200 may differ. In other examples, the structure and operation of industrial automation environment 300 may be different.

In operation, machine learning (ML) model 344 queries tag array 345 for a set of programming tags available for use in automated industrial system 331. Tag array 345 responds by transferring tag data to machine learning model 344 that indicates the available program tags and their corresponding variables. Machine learning model 344 receives the indication and identifies the set of available program tags that represent independent variables in automated industrial system 331. In some examples, there may be as many as 15,000 available program tags in automated industrial system 331. Machine learning model 344 determines correlations between all of the available program tags for automated industrial system 331. For example, machine learning model 344 may ingest feature vectors that represent the available program tags in automated industrial system 331 and process the ingested feature vectors using machine learning algorithms to determine correlations and causal relationships between the process variables represented by the available program tags. In some examples, machine learning model 344 may utilize statistical analysis to determine correlations between all the available program tags. For example, machine learning model may perform a regression analysis and/or some other type of mathematical analysis on the available program tags to identify correlations and causal relationships between the tags. In some examples, machine learning model 344 may track historical associations between the available program tags to determine correlations and causal relationships. For example, machine learning model 344 may identify a set of tags that are commonly used together in control programs and determine those tags are correlated with one another. In some examples, machine learning model 344 may track the frequency of association between tags. For example, machine learning model 344 may determine a set of tags are used together 90% of the time for a given process. Model 344 generates a correlation matrix that indicates correlations and causal relationships between all of the available program tags in automated industrial system 331 based on correlations and causal relationships of their underlying process variables. The correlation matrix may comprise a data structure with entries for each available tag. For example, the correlation matrix may comprise an entry for program tag 311 that indicates the identity of program tag 311 and all other available program tags that correlated with tag 311. Machine learning model 344 transfers the correlation matrix to tag array 345 for storage.

Application (APP.) 302 generates control program 310 and selects one of program tags 311-319 that represents a target variable in automated industrial system 331. For example, tag 315 may represent the viscosity of a substance in industrial device 333. An operator may wish to adjust the viscosity of the substance to a desired setpoint and in response, selects tag 315 via user interface 303. Application 303 may receive the user input from the operator via user interface 303. Application 303 transfers a message indicated the selected tag for delivery to tag array 345. For example, Application 303 may drive server 302 to transfer a message to tag array 345 in data science environment 311 that indicates the selected tag. Server 302 may utilize wired and/or wireless links to transfer the message indicating the selected tag.

Tag array 345 receives the message indicating the selected tag. Tag array 345 identifies the selected tag. Tag array 345 accesses the correlation matrix generated by machine learning model 344 and identifies other available program tags that are correlated with or have a causal relationship with the selected tag. For example, tag array 345 may access a data entry in the correlation matrix for the selected tag to determine available correlated program tags. Tag array 345 generates a recommendation that indicates available correlated program tags. Tag array 345 transfers the tag recommendation for delivery to application 303.

In alternate examples, application 303 may instead transfer a message indicating the selected tag for delivery to machine learning model 344. In this case, machine learning model 344 may receive the message indicating the selected tag. Machine learning model 344 then queries tag array 345 to access the correlation matrix. Tag array 345 indicates a set of available program tags that are correlated with the selected program tag. Machine learning model 344 may ingest the selected tag and the available tags indicated by tag array 345 as machine learning inputs. Machine learning model 344 processes the ingested tags and generates a machine learning output that comprises a tag recommendation for application 303. The tag recommendation may rank the available program tags by their degree of correlation with the selected tag, identify their type of correlation/causal relation, and/or indicate some other type of relationship. Machine learning model 344 may then transfer the tag recommendation for delivery to application 303.

Returning to the operation, application 303 receives the tag recommendation from tag array 345. Application 303 may present the tag recommendation on user interface 304 for review by a human operator. Application 303 modifies control program 310 based on the recommended tags to optimize the target variable of the selected tag. For example, tag 311 may comprise the selected tag and be originally present in control program 310. The tag recommendation may comprise tags 312-319. Application 303 may receive the tag recommendation comprising tags 312-319 and present tags 312-319 on user interface 304. Application 303 may receive user input via user interface 304 electing to incorporate tags 312-319 into control program. In response to the user input, application 303 may modify control program 310 to include tags 312-319 to optimize the target variable represented by tag 311. The optimization may comprise a target setpoint, a maximization, a minimization, or some other type of change to the target variable. Application 303 directs PLC 321 to implement control program 310 and transfers control program 310 for delivery to PLC 321. For example, application 303 may drive server 302 to transfer control program 310 to PLC 321 via an industrial ethernet link.

PLC 321 receives control program 310 from application 303. PLC 321 executes control program 310 and transfers the executed instructions to the industrial devices 332-335. For example, industrial device 335 may comprise a heat exchanger and tag 313 may dictate a temperature differential setting for industrial device 335. PLC 321 may execute instructions of tag 313 and determine a valve setting to achieve a cold-water flow rate that results in the desired temperature differential. PLC 321 may transfer executed instructions of tag 313 to industrial device 335. In response, industrial device 335 may activate valve actuators and set the valve to the position indicated by the instructions.

Industrial devices 332-335 of automated industrial system 331 receive the executed instructions from PLC 321. Automated industrial system 331 implements the automated industrial process dictated by control program 310. The implementation of the automated process results in the optimization of the target variable represented by the selected tag of control program 310.

Figure 5:
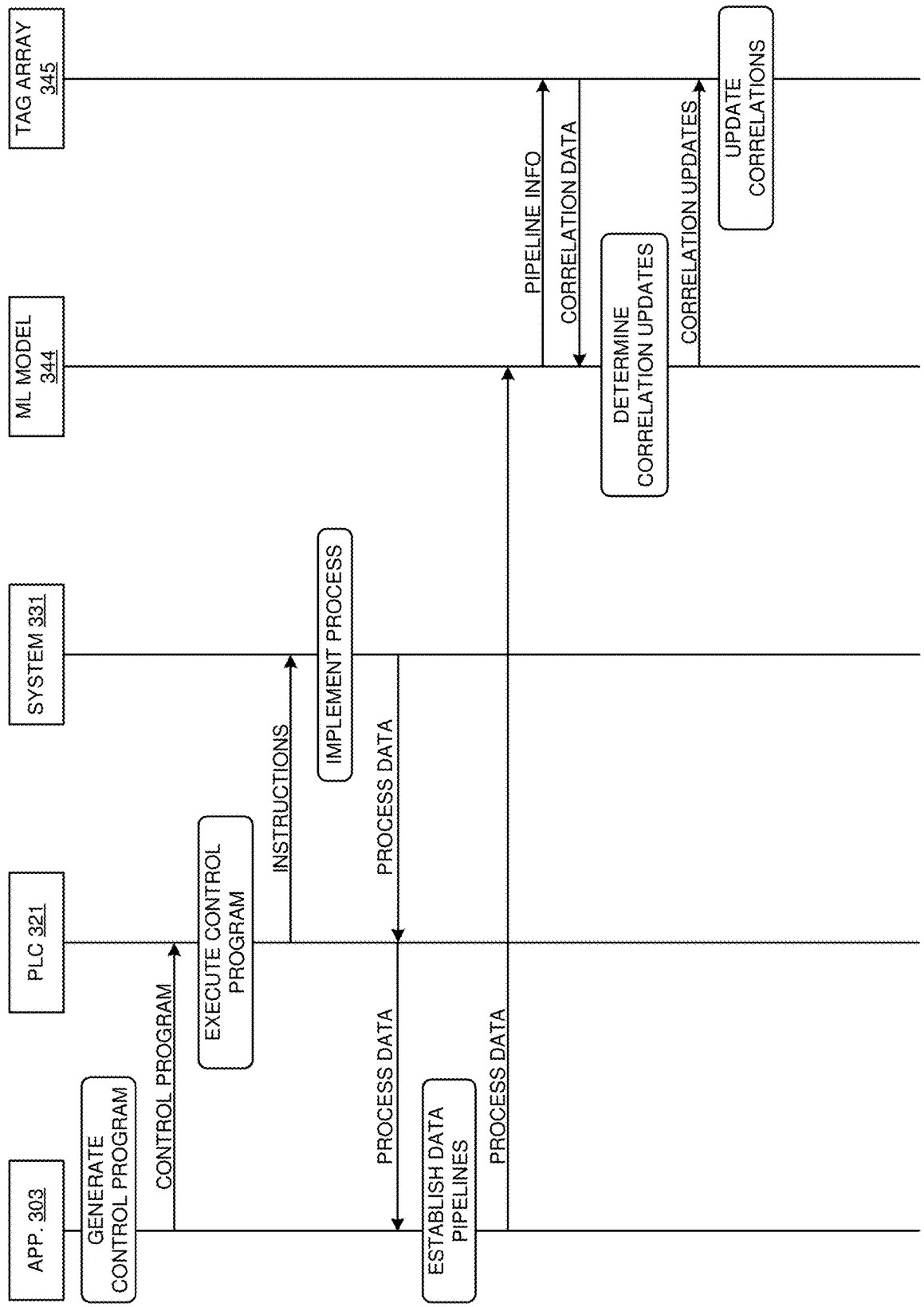
FIG. 5 illustrates an exemplary operation of an industrial automation environment to optimize a target variable in the industrial automation environment.

FIG. 5 illustrates an exemplary operation of industrial automation environment 300 to optimize a functional block diagram for implementation by a PLC. The operation depicted by FIG. 5 comprises an example of process 200 illustrated in FIG. 2, however process 200 may differ. In other examples, the structure and operation of industrial automation environment 300 may be different.

In operation, application (APP.) 303 generates control program 310. Application 303 adds tags 311-319 to control program 310. For example, application 303 may receive user inputs via user interface 304 that direct application 303 to generate control program 310 and add program tags 311-319 to control program 310. Tags 311-319 represent process variables, operations, system settings, and the like in automated industrial system 331. Application 303 transfers control program 310 to PLC 321 and directs PLC 321 to implement control program 310 in automated industrial system 331.

PLC 321 executes control program 310 and transfers the executed instructions to automated industrial system 331. Automated industrial system 331 receives the executed control instructions and implements an automated industrial process based on the instructions. As automated industrial system 331 implements the industrial process, industrial devices 332-335 generate process data that describes their respective operations. For example, a pressure sensor on industrial device 333 may generate process data that characterizes the pressure of industrial device 333 through the implementation of the industrial process. Automated industrial system 331 transfers the process data to PLC 331. PLC 331 transfers the process data for delivery to application 303.

Application 303 receives the process data generated by industrial devices 332-335 in automated industrial system 331. Application 303 identifies which parts of the process data correlate to machines which ones of tags 311-319. For example, tag 319 may comprise instructions that control the operation of a temperature sensor in industrial device 332, and application 303 may determine that process data generate by that temperature sensor corresponds to tag 319. Application 303 establishes data pipelines with machine learning model 344 that correspond to tags 311-319. Application 303 transfers process data for program tags 311-319 to machine learning (ML) model 344 using the respective data pipelines. For example, application 303 may transfer process data associated with tag 311 to machine learning model 345 using the data pipeline established for tag 311. In some examples, when a tag is removed from control program 310, application 303 disables the data pipeline with machine learning model 344 for the removed tag.

Machine learning model 334 transfers pipeline information indicating tags 311-319 to tag array 345. The pipeline information indicates the machine learning model 344 is consuming data associated with tags 311-319 using corresponding data pipelines. Tag array 345 receives and stores the pipeline information. In some examples, machine learning model 344 may transfer pipeline information to human operators in data science environment 311 to notify the operators about what type of data machine learning model is receiving. For example, the pipeline information may indicate machine learning model 344 is receiving process data for tag 317 over a data pipeline. Alternatively, tag array 345 may indicate the pipeline information to a human operator in data science environment 311. For example, tag array 345 may comprise a user interface component and may indicate the data pipelines used by machine learning model 344 to a human operator via the user interface component. In some examples, when a tag is removed in control program 310 and its pipeline is disabled, machine learning model 344 may indicate that pipeline is no longer active.

Tag array 345 transfers correlation data to machine learning model 344. Machine learning model 344 receives and consumes the process data received over the data pipelines for tags 311-319. Machine learning model 344 receives and consumes the correlation data from tag array 345. The correlation data comprises the available tags usable in automated industrial system 331 and their correlations with other available tags. Machine learning model 344 utilizes its machine learning algorithms to process the process data for tags 311-319 and the correlation data from tag array 345. Machine learning model 344 determines correlation updates for tags 311-319 and the other available tags based on the ingested process data and the correlation data from tag array 345. In some examples, machine learning model 344 conducts a statistical analysis between all available tags for system 331, including tags 311-319, to determine correlation updates and causal relations updates between the process variables in system 331 the tags represent. The statistical analysis may comprise a mathematical regression process, a machine learning analysis process, or some other type of statistical process. In some examples, machine learning model 344 determines correlations and casual relations based on historical use of the tags. For example, machine learning model 344 may determine that tag 312 and tag 313 have been used together in other previous control programs, and based on the historical relations, determine a correlation update between tags 312 and 313. Machine learning model 344 may further track the frequency of historical usage between tags. For example, machine learning model 344 determines that tag 312 and tag 313 are infrequently used together for a given process and determine that tag 312 and tag 313 are lightly correlated.

Machine learning model 344 transfers the correlation updates and causal relationships updates to tag array 345. Tag array 345 stores the updated correlations and causal relations between the available program tags. For example, tag array 345 may update a correlation matrix that indicates the correlations and causal relations between all available tags. In some examples, application 303 may access tag array 345 to determine correlations between program tags when generating a control program. In some examples, machine learning model 344 may continually ingest process data generated by automated industrial system 331 and correlation data from tag array 344 to continually update and track correlations between the tags.

Figure 6:
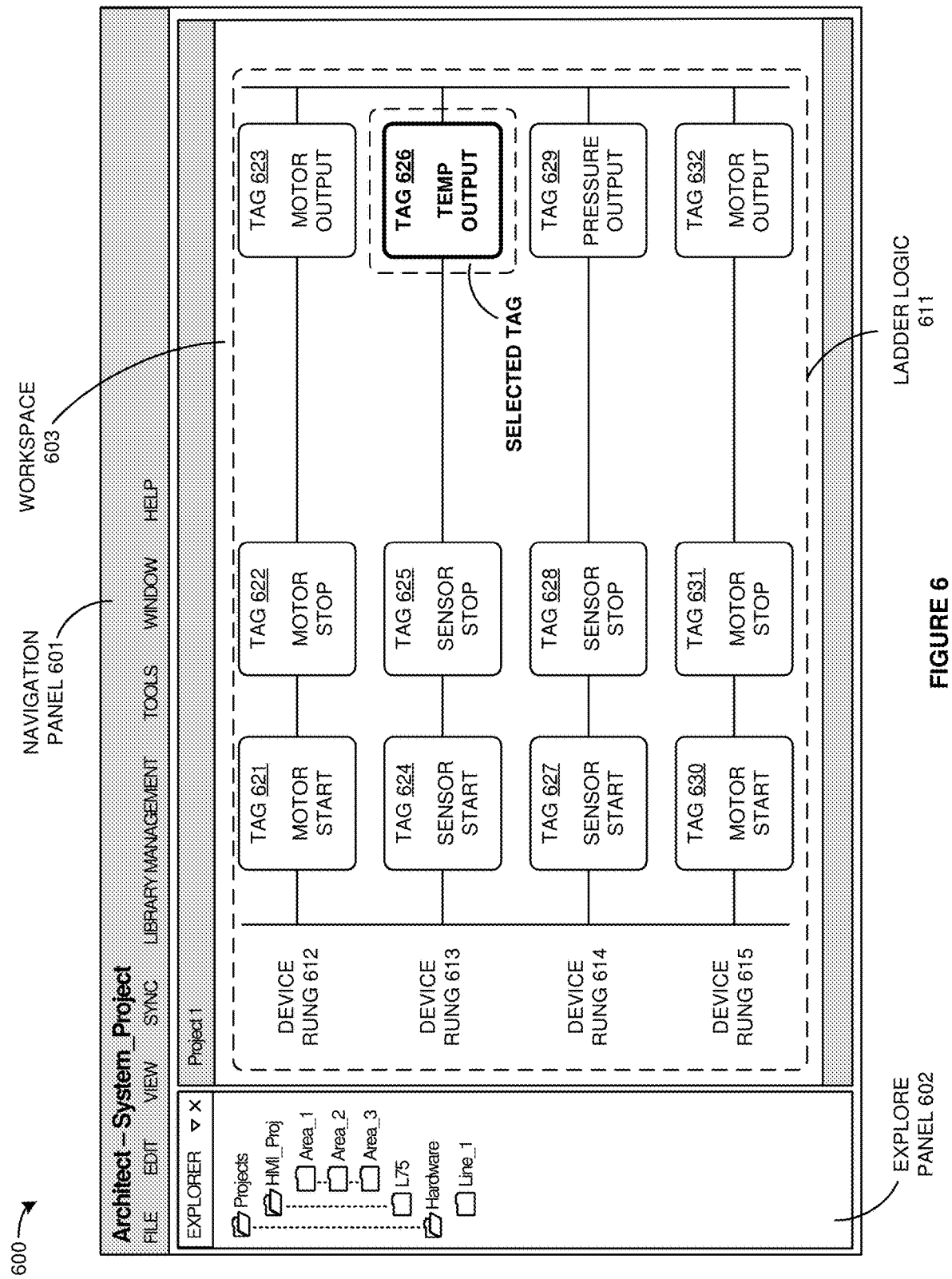
FIG. 6 illustrates an exemplary user interface in an industrial automation environment.

FIG. 6 illustrates user interface 600 to optimize a target variable in an automated industrial process. User interface 600 comprises an example of user interface 103 and user interface 304, however user interface 103 and user interface 304 may differ. User interface 600 comprises a programming environment presented on a display screen which is representative of any user interface for generating control code. For example, user interface 601 may comprise a Guided User Interface (GUI) configured to allow a user to interact with a design application to generate control program represented as a ladder logic diagram.

User interface 600 includes navigation panel 601 that allows a user to access the various features available through user interface. Navigation panel 601 comprises tabs like "FILE", "EDIT", "VIEW", "LIBRARY MANAGEMENT", "TOOLS", "WINDOW", and "HELP". In other examples, navigation panel 601 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to save a project to memory. Navigation panel 601 is located on a top portion of user interface 600 however navigation panel 601 may be located on a different portion of user interface 600. For example, navigation panel 601 may be located on the bottom portion of user interface 600.

User interface 600 incudes explore panel 602. Explore 602 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. For example, a user may select the "L75" folder to access its contents. Explore panel 602 is located on a left portion of user interface 600 however explore panel 602 may be located on a different portion of user interface 600. For example, explore panel 602 may be located on the right portion of user interface 600.

User interface 600 includes workspace 603. Workspace 603 comprises ladder logic 611. Ladder logic 611 is an example of a control program configured implementation of a Programmable Logic Controller (PLC). A user may interact with user interface 600 to construct ladder logic 611 on workspace 603. Ladder logic 611 is organized into rungs 612-615. In this example, each of rungs 612-615 comprise a set of program tags that comprise control instruction for an industrial device within an industrial automation environment. Device rung 612 comprises tags 621-623, device rung 613 comprises tags 624-626, device rung 614 comprises tags 627-629, and device rung 615 comprises tags 630-632. For example, a PLC may execute the control instructions formed by tags 621-623 of device rung 612 to control the operation of a corresponding industrial device. Each of tags 621-632 comprise control instructions that direct their corresponding industrial device to perform a specific action. For example, tag 624 comprises a sensor start command, tag 625 comprises a sensor stop command, and tag 625 comprises a sensor output command. In other examples, some or all of tags 621-632 may comprise different types of control instructions. Tag 626 comprises a "selected tag". For example, user interface 600 may receive one or more user inputs to select 626. The selection comprises an optimization request for the variable represented by tag 626. In this example, tag 626 comprises a temperature output command and the optimization request may wish to achieve a temperature setpoint, a temperature range, maximize the temperature, or minimize the temperature. In response to the selection, user interface 600 may interact with a machine learning model and/or correlation repository to surface program tags correlated with the selected tag.

Figure 7:
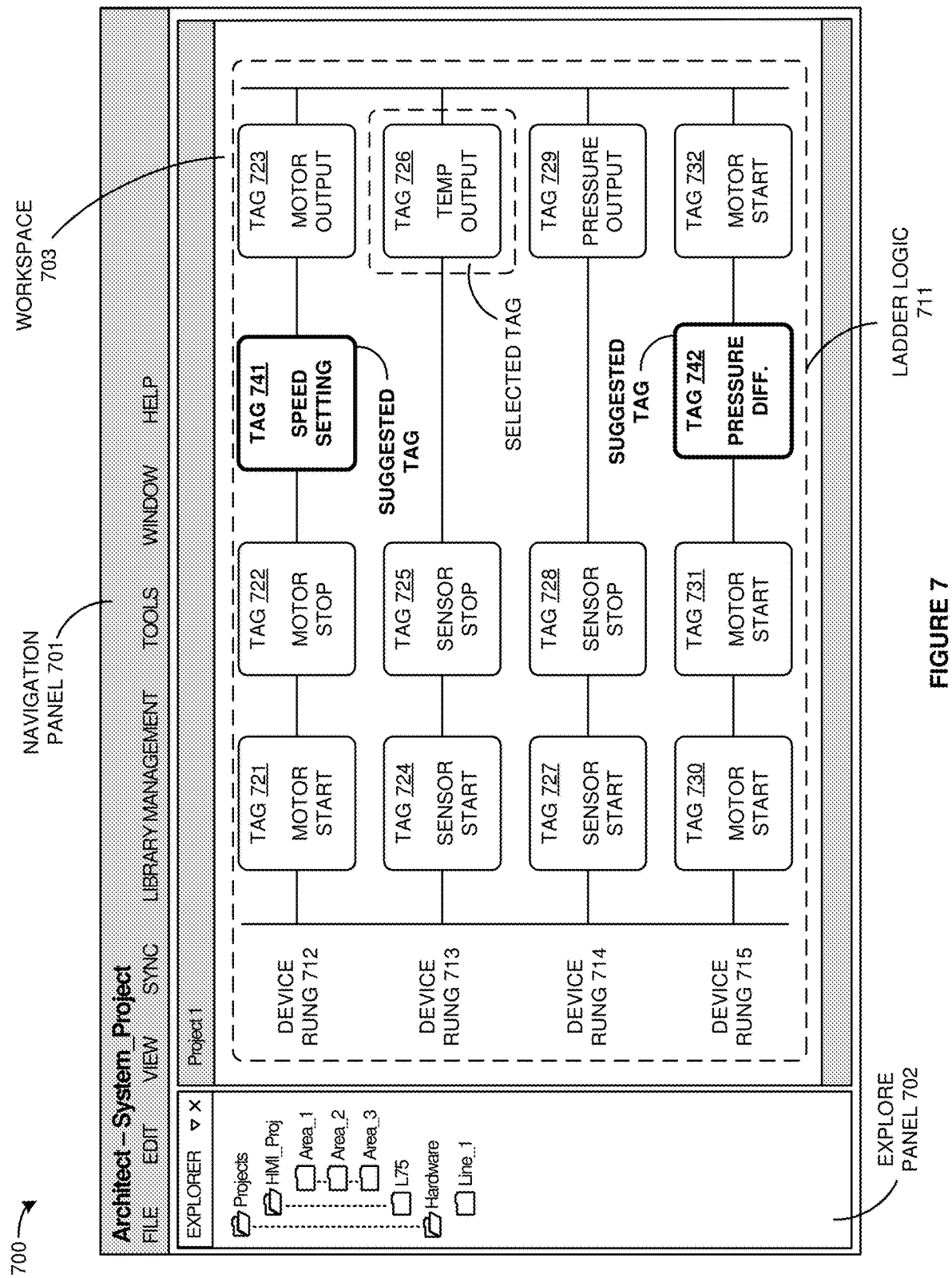
FIG. 7 illustrates an exemplary user interface in an industrial automation environment.

FIG. 7 illustrates user interface 700 to apply machine learning optimizations into an industrial process. User interface 700 comprises an example of user interface 103 and user interface 304, however user interface 103 and user interface 304 may differ. User interface 700 comprises a programming environment presented on a display screen which is representative of any user interface for generating control code. For example, user interface 701 may comprise a graphical representation on a display screen of a computing device that allows a user to interact with a design application to generate a control program formed by a ladder logic diagram.

User interface 700 includes navigation panel 701 that allows a user to access the various features available through user interface. Navigation panel 701 comprises tabs like "FILE", "EDIT", "VIEW", "LIBRARY MANAGEMENT", "TOOLS", "WINDOW", and "HELP". In other examples, navigation panel 701 may comprise fewer tabs, more tabs, and/or different types of tabs. A user may select a tab to access the functionality of the tab. Upon selection, the tabs may open drop down menus that list their functionality. For example, a user may select the "FILE" tab and select an option from a drop-down menu to save a project to memory. Navigation panel 701 is located on a top portion of user interface 700 however navigation panel 701 may be located on a different portion of user interface 700. For example, navigation panel 701 may be located on the bottom portion of user interface 700.

User interface 700 incudes explore panel 702. Explore 702 panel comprises a file navigation system that allows a user to access various projects and view information. The files comprise names like "Projects", "HMI_Proj", "Area_2", "Area_2", "Area_3", "L75", "Hardware", and "Line_1". The files are organized in a hierarchy. A user may select one of the files to access the contents stored within the file. For example, a user may select the "L75" folder to access its contents. Explore panel 702 is located on a left portion of user interface 700 however, explore panel 702 may be located on a different portion of user interface 700. For example, explore panel 702 may be located on the right portion of user interface 700.

User interface 700 includes workspace 703. Workspace 703 comprises ladder logic 711. Ladder logic 711 is an example of a control program configured implementation of a Programmable Logic Controller (PLC). A user may interact with user interface 700 to construct ladder logic 711 on workspace 703. Ladder logic 711 is organized into rungs 712-715. Each of rungs 712-715 comprise a set of program tags that comprise control instruction for an industrial device within an industrial automation environment. Device rung 712 comprises tags 721-723, device rung 713 comprise tags 724-726, device rung 714 comprises tags 727-729, and device rung 715 comprises tags 730-732. Each of tags 721-732 comprise control instructions that direct their corresponding industrial device to perform a specific action. In other examples, some or all of tags 721-732 may comprise different types of control instructions.

Tag 726 comprises the "selected tag" generated by a user input to optimize the target variable represented by tag 726. In response to the selection of tag 726 for optimization, user interface 700 populates ladder logic 711 with suggested tags 741 and 742. Suggested tag 741 is presented on device rung 712 and suggested tag 742 is presented on device rung 715. Suggested tags 741-742 comprises programming tags correlated with the selected tag, which in this example comprises tag 726. For example, a machine learning model may determine correlations between suggested tags 741-742 and selected tag 726 and indicated suggested tags 741-742 to user interface 700. A user may interact with user interface 700 to accept and incorporate suggested tags 741-742 into ladder logic 711 to optimize the target variable represented by tag 726.

Figure 8:
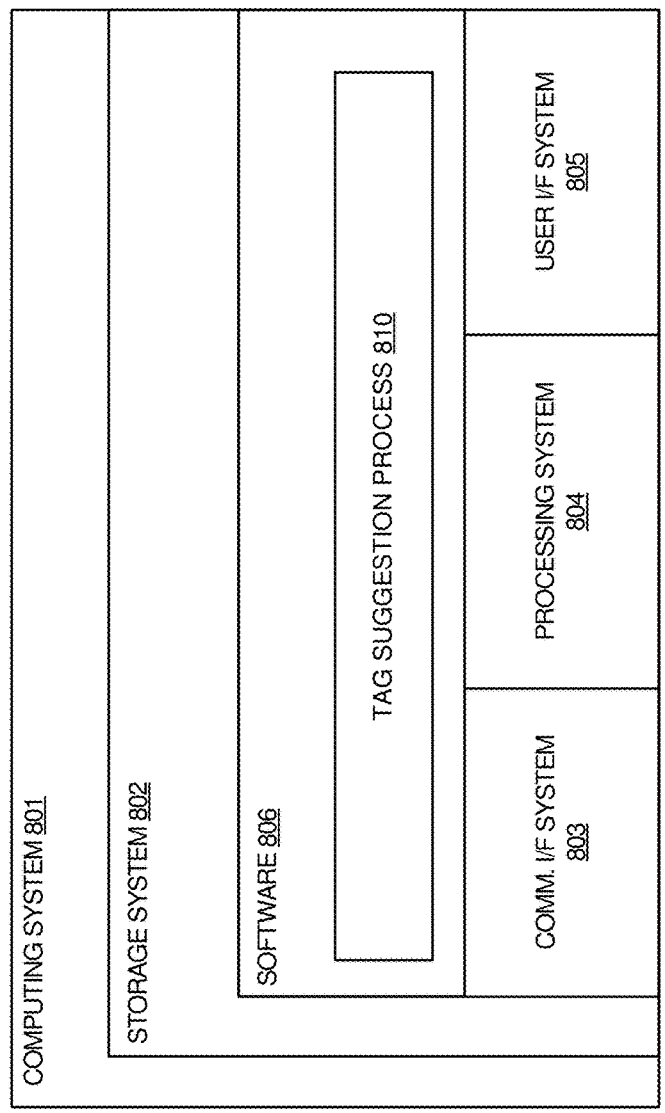
FIG. 8 illustrates an exemplary computing device that may be used in accordance with some embodiments of the present technology.

FIG. 8 illustrates computing system 801 to perform machine learning model implementation according to an implementation of the present technology. Computing system 801 is representative of any system or collection of systems with which the various operational architectures, processes, scenarios, and sequences disclosed herein for utilizing machine learning models within industrial automation environments may be employed. For example, computing system 801 may be representative of computing device 102, machine learning model repository 112, server 302, server 343, PLC 321, and/or any other computing device contemplated herein. Computing system 801 may be implemented as a single apparatus, system, or device or may be implemented in a distributed manner as multiple apparatuses, systems, or devices. Computing system 801 includes, but is not limited to, processing system 804, storage system 802, software 806, communication interface system 803, and user interface system 805. Processing system 804 is operatively coupled with storage system 802, communication interface system 803, and user interface system 805.

Processing system 804 loads and executes software 806 from storage system 802. Software 806 includes and implements tag suggestion process 810, which is representative of any of the machine learning analysis processes discussed with respect to the preceding Figures, including but not limited to the industrial control, target variable optimization, and variable correlation operations. For example, tag suggestion process 810 may be representative of process 200 illustrated in FIG. 2, the exemplary operation of environment 300 illustrated in FIG. 4, and/or the exemplary operation of environment 300 illustrated in FIG. 5. When executed by processing system 804 to provide tag suggestion functions, software 806 directs processing system 804 to operate as described herein for at least the various processes, operational scenarios, and sequences discussed in the foregoing implementations. Computing system 801 may optionally include additional devices, features, or functionality not discussed for purposes of brevity.

Processing system 804 may comprise a micro-processor and other circuitry that retrieves and executes software 806 from storage system 802. Processing system 804 may be implemented within a single processing device but may also be distributed across multiple processing devices or sub-systems that cooperate in executing program instructions. Examples of processing system 804 include general purpose central processing units, graphical processing units, application specific processors, and logic devices, as well as any other type of processing device, combinations, or variations thereof.

Storage system 802 may comprise any computer readable storage media readable by processing system 804 and capable of storing software 806. Storage system 802 may include volatile, nonvolatile, removable, and/or non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 802 may also include computer readable communication media over which at least some of software 806 may be communicated internally or externally. Storage system 802 may be implemented as a single storage device but may also be implemented across multiple storage devices or sub-systems co-located or distributed relative to each other. Storage system 802 may comprise additional elements, such as a controller, capable of communicating with processing system 804 or possibly other systems.

Software 806 (including tag suggestion process 810) may be implemented in program instructions and among other functions may, when executed by processing system 804, direct processing system 804 to operate as described with respect to the various operational scenarios, sequences, and processes illustrated herein. For example, software 806 may include program instructions for determining correlations between variables in an automated industrial process and surfacing tag suggestions based on the correlations as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 806 may include additional processes, programs, or components, such as operating system software, virtualization software, or other application software. Software 806 may also comprise firmware or some other form of machine-readable processing instructions executable by processing system 804.

In general, software 806 may, when loaded into processing system 804 and executed, transform a suitable apparatus, system, or device (of which computing system 801 is representative) overall from a general-purpose computing system into a special-purpose computing system customized to provide machine learning functionality to an industrial automation environment as described herein. Indeed, encoding software 806 on storage system 802 may transform the physical structure of storage system 802. The specific transformation of the physical structure may depend on various factors in different implementations of this description. Examples of such factors may include, but are not limited to, the technology used to implement the storage media of storage system 802 and whether the computer-storage media are characterized as primary or secondary storage, as well as other factors.

For example, if the computer readable storage media are implemented as semiconductor-based memory, software 806 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 803 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and an extended discussion of them is omitted for the sake of brevity.

While some examples provided herein are described in the context of a tag suggestion computing device, it should be understood that the condition systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system to train a machine learning model for implementation in an industrial automation environment, the system comprising:
   a memory that stores executable components; and
   a processor, operatively coupled to the memory, that executes the executable components, the executable components comprising:
   a processing component configured to identify program tags that represent process variables in an industrial process, ingest feature vectors that represent the program tags, utilize machine learning algorithms to process the feature vectors and determine correlations between the program tags, and generate a correlation matrix that indicates the correlations between the program tags based on the utilization of the machine learning algorithms;
   a design component configured to generate a control program configured for implementation by a programmable logic controller and select a program tag in the control program that represents a target variable in the industrial process, wherein the target variable comprises one of the process variables;
   the processing component configured to access the correlation matrix, select ones of the program tags that represent independent process variables that are correlated with the selected program tag that represents the target variable in the industrial process based on the correlations indicated by the correlation matrix, and generate a recommendation that indicates the ones of the program tags; and the design component configured to modify the control program using the ones of the program tags to optimize the target variable based on the correlations between the independent process variables represented by the ones of the program tags and the target variable represented by the selected program tag and transfer the control program for implementation by the programmable logic controller.

2. The system of claim 1 wherein the processing component is further configured to utilize the machine learning algorithms to perform statistical analysis on the feature vectors and determine the correlations between the program tags based on the statistical analysis.

3. The system of claim 1 wherein the processing component is further configured to utilize the machine learning algorithms to determine a historical relationship between the feature vectors based on a previous association between the program tags and determine the correlations between the program tags based on the historical relationship.

4. The system of claim 1 wherein the processing component is further configured to utilize the machine learning algorithms to perform statistical analysis on the feature vectors, determine a historical relationship between the feature vectors based on a previous association between the program tags, and determine the correlations between the program tags based on the statistical analysis and the historical relationship.

5. The system of claim 1 wherein the recommendation that indicates the ones of the program tags comprises a machine learning output that indicates the ones of the program tags.

6. The system of claim 1 wherein the industrial process comprises one or more of a manufacturing process, a chemical production process, or a food processing process.

7. The system of claim 1 wherein the control program comprises a ladder logic diagram configured for implementation by the programmable logic controller.

8. A non-transitory computer-readable medium storing instructions to perform variable optimization in an industrial automation environment, wherein the instructions, in response to execution by a processor, cause the processor to drive a system to perform operations comprising:

identifying program tags that represent process variables in an industrial process, ingesting feature vectors that represent the program tags, utilizing machine learning algorithms to process the feature vectors and determine correlations between the program tags, and generate a correlation matrix that indicates the correlations between the program tags based on the utilization of the machine learning algorithms;

generating a control program configured for implementation by a programmable logic controller and selecting a program tag in the control program that represents a target variable in the industrial process, wherein target variable comprises one of the process variables;

accessing the correlation matrix, selecting ones of the program tags that represent independent process variables that are correlated with the selected program tag that represents the target variable in the industrial process based on the correlations indicated by the correlation matrix, and generating a recommendation that indicates the ones of the program tags; and modifying the control program using the ones of the program tags to optimize the target variable based on the correlations between the independent process variables represented by the ones of the program tags and the target variable represented by the selected program tag and transferring the control program for implementation by the programmable logic controller.

9. The non-transitory computer-readable medium of claim 8, wherein the operations further comprise utilizing the machine learning algorithms to perform statistical analysis on the feature vectors and determining the correlations between the program tags based on the statistical analysis.

10. The non-transitory computer-readable medium of claim 8, wherein the operations further comprise utilizing the machine learning algorithms to determine a historical relationship between the feature vectors based on a previous association between the program tags and determining the correlations between the program tags based on the historical relationship.

11. The non-transitory computer-readable medium of claim 8, wherein the operations further comprise utilizing the machine learning algorithms to perform statistical analysis on the feature vectors and determine a historical relationship between the feature vectors based on a previous association between the program tags and determining the correlations between the program tags based on the statistical analysis and the historical relationship.

12. The non-transitory computer-readable medium of claim 8, wherein generating the recommendation that indicates the ones of the program tags comprises generating a machine learning output that indicates the ones of the program tags.

13. The non-transitory computer-readable medium of claim 8, wherein the industrial process.

14. The non-transitory computer-readable medium of claim 8 wherein the control program comprises a ladder logic diagram configured for implementation by the programmable logic controller.

15. A method to perform variable optimization in an industrial automation environment, the method comprising:

identifying program tags that represent process variables in an industrial process, ingesting feature vectors that represent the program tags, utilizing machine learning algorithms to process the feature vectors and determine correlations between the program tags, and generate a correlation matrix that indicates the correlations between the program tags based on the utilization of the machine learning algorithms;

generating a control program configured for implementation by a programmable logic controller and selecting a program tag in the control program that represents a target variable in the industrial process, wherein the target variable comprises one of the process variables;

accessing the correlation matrix, selecting ones of the program tags that represent independent process variables that are correlated with the selected program tag that represents the target variable in the industrial process based on the correlations indicated by the correlation matrix, and generating a recommendation that indicates the ones of the program tags; and modifying the control program using the ones of the program tags to optimize the target variable based on the correlations between the independent process variables represented by the ones of the program tags and the target variable represented by the selected program tag and transferring the control program for implementation by the programmable logic controller.

16. The method of claim 15 further comprising utilizing the machine learning algorithms to perform statistical analysis on the feature vectors and determining the correlations between the program tags based on the statistical analysis.

17. The method of claim 15 further comprising utilizing the machine learning algorithms to determine a historical relationship between the feature vectors based on a previous association between the program tags and determining the correlations between the program tags based on the historical relationship.

18. The method of claim 15 further comprising utilizing the machine learning algorithms to perform statistical analysis on the feature vectors and determine a historical relationship between the feature vectors based on a previous association between the program tags and determining the correlations between the program tags based on the statistical analysis and the historical relationship.

19. The method of claim 15 wherein generating the recommendation that indicates the ones of the program tags comprises generating a machine learning output that indicates the ones of the program tags.

20. The method of claim 15 wherein the industrial process comprises one or more of a manufacturing process, a chemical production process, or a food processing process.

\* \* \* \* \*